June 11, 1968 R. M. HIGGINS 3,388,047
CONTROLLED ELECTROLYTIC TREATMENT OF MATERIALS
Filed July 30, 1965
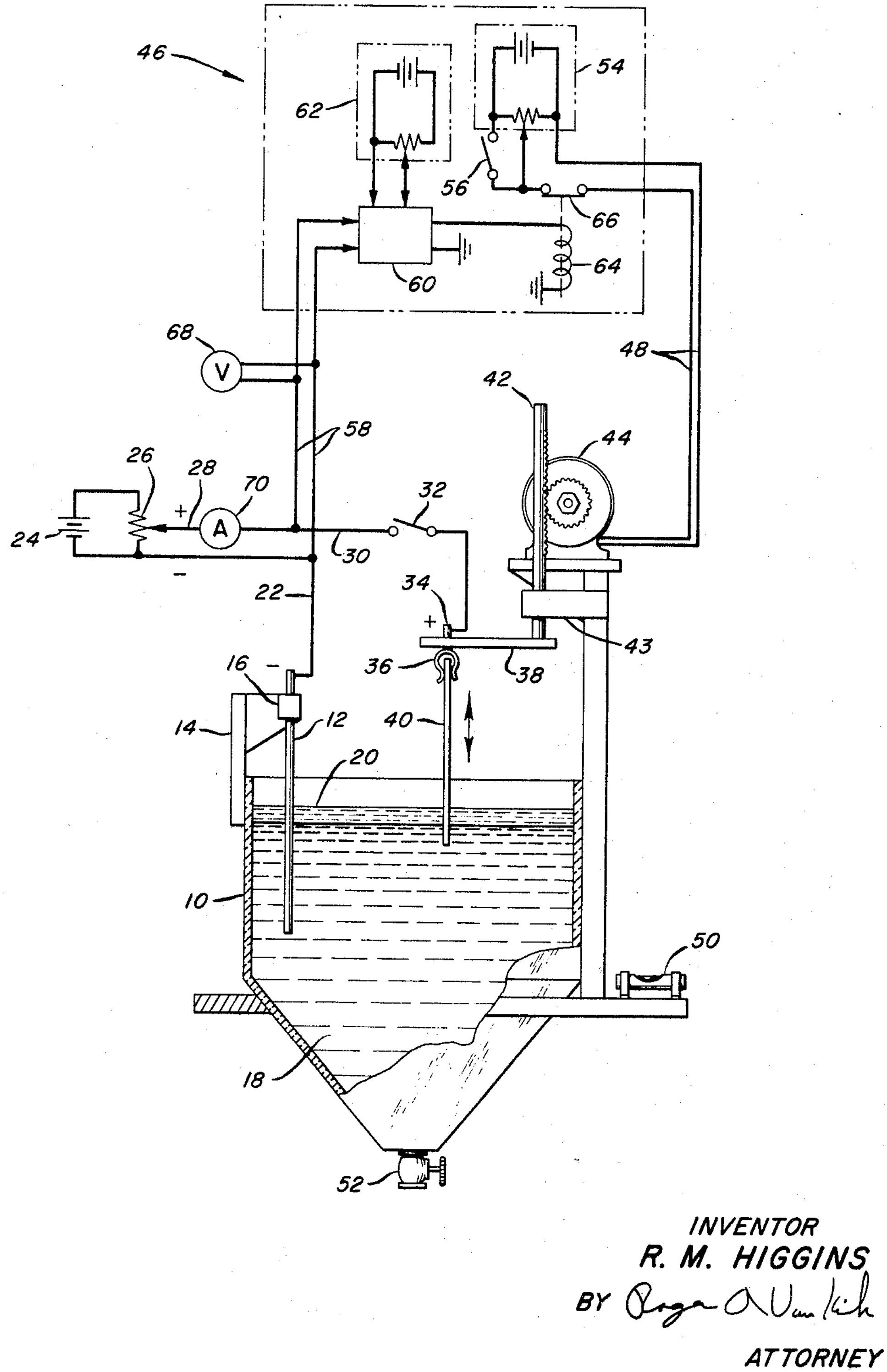
INVENTOR
R. M. HIGGINS
BY [signature]
ATTORNEY United States Patent Office 3,388,047

Patented June 11, 1968

3,388,047
CONTROLLED ELECTROLYTIC TREATMENT OF MATERIALS

Ralph M. Higgins, Trenton, N.J., assignor to Western Electric Company, Incorporated, New York, N.Y., a corporation of New York Filed July 30, 1965, Ser. No. 476,003
16 Claims. (Cl. 204—15)

This invention relates to the electrolytic treatment of materials. More particularly, this invention is directed to electrolytic etching or anodizing of thin films of conductive or semiconductive materials.

The advantages of thin-film circuitry from the standpoint of ease of manufacture, reliability and volumetric efficiency, but to name a few, are well known. Thus, there is understandably intense interest in the electronics and communications industries in the development of processes for the manufacture of thin-film devices and circuits. In such manufacture, for the yield of usable devices to reach an acceptable level, quality control techniques must be evolved. One of the more important parameters to be controlled is the thickness of the films. For example, it is well known that the resistance of a thin film is a function of its thickness. Since the films are usually formed on nonconductive substrates in a low-pressure environment by cathodic sputtering or vapor deposition, and further since it is desirable that the film-forming process be carried on in continuous fashion, it is virtually impossible to accurately monitor the thickness of the films as formed. Thus, the process parameters are adjusted so as to normally produce the desired results and quality control is achieved by selection of samples from the line for film thickness measurement.

In order for control of the foregoing type to be practical, the thickness measurement must be made rapidly and accurately. The thickness to be measured is usually between 1000 A. and 4000 A. with an allowable error of about 12 A. It will be readily apparent that such measurement presents difficult problems. Apparatus capable of rapidly performing the requisite fine thickness measurement is available and, for a discussion thereof, reference may be had to an article by Schwartz and Brown entitled "A Stylus Method for Evaluating the Thickness of Thin Films and Substrates Surface Roughness," which appeared at pp. 836–845 of vol. II of the 1961 Transactions of the Eighth National Vacuum Symposium.

In order for film thickness measurements with the device described in the aforementioned article to be accurate, it is essential that a sharply defined step or "cliff" exist where the film to be measured ends and the underlying material is exposed and that there be no erosion of the underlying material adjacent to this step. Prior to this invention, it was impossible to quickly remove a single deposited thin film of refractory metal in such a manner as to yield a sharply defined step or "cliff" without simultaneously etching the underlying material. That is, all previously known methods of film removal worthy of consideration for forming the required "cliff" produced erosion of the underlying material because the etchants employed also attacked the underlying material.

In the conversion of area films into discrete circuit components, it is necessary to etch or remove the film only in localized areas. To this end, regions of the film or films which will be retained and thus form the components are protected from the etchant by a coating of etch-resistant material. However, since it is standard practice to immerse the entire film-supporting substrate in the etchant, there will be undercutting of the coated regions while the unprotected film material is being attacked by the etchants. As should be obvious, if precision components are to be formed, such undercutting must be minimized.

In fabricating thin-film devices it is also desirable, in order to cut down on the number of interconnections, that like components of different value be formed on a single substrate. In the past, thin-film resistor arrays have typically been formed by depositing the resistive material as an area film on a substrate, etching a resistor array and finally trim anodizing the resistors to value. It is possible to individually anodize resistors formed on a single substrate by techniques such as that disclosed in U.S. Patent 3,148,129, issued Sept. 8, 1964, to Basseches et al. and assigned to Bell Telephone Laboratories, Incorporated. However, the Basseches et al. and other similar procedures require that a dam or boot be formed or accurately positioned around each resistor or group of resistors prior to anodization and removed after the trimming step has been completed.

The foregoing comments also apply to thin-film capacitor manufacture. As disclosed in U.S. Patent 2,993,226, issued July 25, 1961, to R. W. Berry and assigned to Bell Telephone Laboratories, Incorporated, thin-film capacitors are presently produced by deposition of a film-forming metal on a nonconductive substrate, either through a mask or as an area film. If the metal is deposited as an area film, the deposition step will be followed by isolation of a plurality of capacitor electrodes. Next, these electrodes are anodized to form the capacitor dielectric material. The anodization process controls the thickness of the oxide-dielectric layer formed and thus controls the ultimate value of the capacitors. If, as is the usual case, it is desired to provide capacitors of different value on one substrate, anodization must presently be performed locally using a method similar to that disclosed in the above-mentioned Basseches et al. patent, or the capacitor electrodes must be connected in turn to the positive terminal of the source of potential and anodized individually.

This invention overcomes the above-stated and other problems and disadvantages and precipitates previously unobtainable efficiencies by providing novel methods and apparatus for the electrolytic treatment of materials.

Accordingly, it is an object of this invention to electrolytically treat materials.

It is another object of this invention to electrolytically etch materials.

It is also an object of this invention to anodize materials.

It is yet another object of this invention to electrolytically etch materials along sharply defined lines.

It is still another object of this invention to treat a region of a film of conductive or semiconductive material carried by a substrate without affecting adjacent regions.

It is a further object of this invention to electrolytically treat adjacent areas of a material to different degrees.

It is another object of this invention to sequentially electrolytically treat a plurality of areas of a thin film of conductive or semiconductive material in a more efficient manner than previously possible.

These and other objects of this invention are accomplished by floating an electrolyte as a thin layer on the surface of an inert, nonconductive liquid and connecting a source of current between an electrode exposed thereto and a workpiece to be treated. Since only a selected portion of the workpiece exposed to the electrolyte will be treated, the workpiece may be passed through the electrolyte and into or out of the inert liquid in accordance with either a stored program or monitored process parameter and other portions of the workpiece may thus be treated as desired, the treatment ending abruptly by removal of the workpiece portions from the electrolyte an immersion thereof into the inert liquid.

This invention may be better understood and its numerous advantages will become apparent to those skilled in the art by reference to the accompanying drawing wherein a specific embodiment of this invention is depicted. This embodiment employs a glass treatment tank 10 having a cathode 12 suspended therein from a backet 14 which includes an adjustable clamp 16. Means, not shown, are provided to insulate cathode 12, which will typically be a gold-plated, copper electrode, from bracket 14. Tank 10 holds an inert liquid 18 and, floating as a layer on the top of liquid 18, an electrolyte 20. Liquid 18 and electrolyte 20 are chosen with consideration given to their specific gravities such that the electrolyte will float on the surface of the inert liquid. Tank 10 is filled with liquid 18 to a depth such that cathode 12 will at least extend into the layer of electrolyte 20. For reasons to be explained below, the bottom of tank 10 is cone-shaped and tapers down to a drain valve 52.

Cathode 12 is connected via conductor 22 to the negative terminal of a source of DC potential 24. A potentiometer 26 is connected across source 24. The wiper arm 28 of potentiometer 26 is connected via conductor 30 and switch 32 to a terminal 34. A clamp 36, which extends through and is supported by an insulating support 38, is electrically connected to terminal 34. Clamp 36 receives and holds the workpiece or article 40 to be treated. In the case where article 40 is a substrate carrying a film of conductive or semiconductive material which is to be treated, clamp 36 makes electrical contact thereto. Thus, a variable potential may be applied between the material to be treated and the cathode.

It should be noted that direct current source 24 must be chosen so as to be capable of providing sufficient power to supply any current surges that might take place during the treatment process. When etching, surges often occur due to variations in the amount of material to be etched. Current surges are particularly apt to occur when a plurality of resist-coated patterns are being etched. If resistor patterns are being etched in a workpiece or article, for example, ten tantalum nitride films deposited on a substrate, at one time, there is a chance that all of them will produce a surge at the same instant. At proper speeds of immersion, these surges run to approximately 80 milliamperes for each film-carrying substrate. Therefore, the power supply being used in that instance should be capable of furnishing a minimum of 800 milliamperes to insure complete etching of all ten films.

Support 38 is affixed to the end of a drive shaft 42 which is shown as being adapted for movement in a direction perpendicular to the surface of the bath in tank 10. Movement of shaft 42 is produced by motor 44 in response to command signals generated in a manner to be described below by a logic or control unit indicated generally at 46. Energization of motor 44 in response to a signal generated in unit 46 and supplied to the motor via conductors 48, 48 will cause article 40 to be either lowered further into or raised further out of the inert liquid. In either case, a new region or area of the article to be treated will be exposed to the layer of electrolyte.

A level 50 and adjustable legs, not shown, are provided to permit tank 10 to be adjusted so that the surface of electrolyte 20 may be maintained normal to the plane of the material to be treated and/or parallel to the bottom of article 40 as this is the usual desired treatment arrangement. However, under some circumstances, particularly where article 40 is a substrate carrying a plurality of materials to be formed into a thin-filmed integrated circuit, it may be necessary to have the article enter the electrolyte at some angle other than the vertical orientation shown. For example, there may be materials or regions on one side of the article and adjacent an end thereof which, for fear of contamination, may not be exposed to the bath in tank 10 while the entire reverse side of the article must be treated. In the latter instance, the desired angle of insertion may be achieved by adjusting the above-mentioned legs or, alternatively, the support bracket 43 for shaft 42 may be made to telescope thus pivoting the shaft about the driving gear on motor 44.

Etching process

As noted above, in the etching of either thin-film devices or conductors or for the formation of sharply defined steps or "cliffs" for film thickness measurement, two criteria must be met. First, etching of the underlying material, usually the substrate, must be avoided. Secondly, there should be a sharp line of demarcation, with undercutting minimized, between etched and unetched areas. The first criterion is met by resort to controlled electrolytic eching as opposed to purely chemical etching. By utilizing an etchant that depends upon energy supplied from a source of current, etching will cease upon removal from the etchant of exposed conductive or semiconductive material which is electrically connected to the source. Of course, for etching of patterns, the material to be retained on the nonconductive substrate must be protected from the electrolyte. Such protection may be achieved by coating the material to be retained. The protective coating will typically be a photoresist applied and thereafter exposed through a mask, and removed where unexposed in accordance with practices well known in the art.

The second criterion noted above is met by floating the etchant as a layer on an inert liquid and controlling the rate at which the film to be treated is immersed therein. By following this procedure, etching will take place only at the surface of the etchant. Once all material initially exposed to the etchant and connected to the source of electrical energy has either been removed from the substrate or isolated from the untreated material, etching can occur only where previously untreated material is exposed to the etchant.

In operation, the bath is prepared by floating the electrolyte on the surface of the inert liquid as a layer of the desired thickness. Usually, the layer of electrolyte will be as thin as possible. Next, the article 40 to be treated, typically a thin film carrying substrate, is inserted in clamp 36. The wiper arm 28 of potentiometer 26 is then adjusted by the operator to apply a voltage between the cathode 12 and article 40 which will result in a desired etching current. This current, which is determined by the material to be treated (removed) and its thickness, will be self limiting as long as the proper rate of immersion of the substrate into the electrolyte is maintained.

The speed at which motor 44 drives article 40 through the electrolyte is next set by manually adjusting a variable voltage supply 54 to a value determinative of the desired speed. This speed and the voltage commensurate therewith may be selected from data reporting the results of tests conducted to optimize etching conditions. The motor control voltage is applied via conductors 48 to motor 44.

After adjustment of the etching and motor speed control voltages as above described, article 40 is immersed in the bath in tank 10 to a depth necessary to place the point on the article where etching is to be initiated at the surface of etchant layer 20. It should be noted that, if etching is to be initiated at any place other than the leading edge of the conductive portion of the article, conductive regions which will be exposed to the electrolyte but not etched must be protected by an etch-resistant material. The initial immersion may be accomplished manually either by mechanically turning the rotor of motor 44 or by closing switch 56 in unit 46 so as to apply a driving voltage from a source 54 to the motor. It should be noted that it may be desired to impart similar vertical motion to cathode 12. However, it has been found that best results are achieved when the cathode makes contact with etchant layer 20 before immersion of article 40. Therefore, in the embodiment being described, no means for driving cathode 12 is shown. It is, however, to be understood that such means could be incorporated and it is possible to immerse the cathode in the electrolyte either before, simultaneously with or after the material to be treated. After the film-carrying substrate is immersed to the desired level, switch 32 is closed to initiate etching. Once etching begins, the process may either be controlled by the operator or unit 46 may take command and control the speed of immersion. It has been found that as long as the voltage between the cathode and material being etched remains constant, the speed at which the substrate is immersed is of no importance. It is, of course, desirable to etch in as short a time as possible. That is, the material being etched should be removed from a given area and this area then quickly passed into the inert, nonconductive liquid so that etching in this area is rather abruptly terminated and no appreciable undercutting of resist-coated material occurs. However, if the speed of immersion is too rapid, islands of unetched material may be left. It has been found, for example, that the passage of current through a tantalum film completely immersed in an etchant will leave many islands, thus making thickness measurement difficult. To eliminate formation of islands, all etching should take place at the surface of the etchant. As noted above, this will occur, following the teachings of this invention, if the etchant is in the form of a thin layer and if the speed of immersion is controlled.

In order to accurately control immersion speed, the voltage across the electrolyte is applied via conductors 58 to a comparator circuit 60. Circuit 60 senses voltage drops of a fraction of a volt or more in the applied potential and generates, in response to such a voltage drop, an error signal. The voltage-sensing function may be accomplished by state-of-the-art circuits such as, for example, those which compare the voltage being monitored to a reference potential from a variable voltage source 62 which is initially set by the operator as the process voltage is selected. The error signal is amplified and applied to a relay coil 64. The relay, which will be energized when the error signal exceeds a predetermined minimum, controls the application of voltage from source 54 to motor 44. When an error in excess of the minimum is sensed, the relay will be energized and a normally closed switch 66 connected in the circuit between motor 44 and power supply 54 will be opened, thus stopping the motor until the voltage across the etchant returns to its original value signifying complete etching. This start-stop manipulation of the descent motion by unit 46 or, alternatively, by manual operation of switch 66 by an operator watching a volt meter 68 connected between the cathode and material being treated, controls the current that is allowed to pass through the etchant and thus assures complete etching at each level or region exposed to the surface of the etchant before permitting that region to pass on through the etchant into the inert fluid 18. Of course, control may be effected by directly monitoring the current flow through the film being etched. It has been found desirable to plot a family of current vs. immersion speed curves to determine the optimum etching conditions for various materials of various thicknesses. These curves will provide the operator with an immersion speed setting and a minimum current commensurate with complete etching for that speed. Ammeter 70 may then be observed and, when incomplete etching is indicated by an increase in current above this minimum, motor 40 may be stopped. Since etching occurs only at the surface of the electrolyte and stops immediately upon immersion in the inert liquid, it can be seen that by practice of this invention sharply defined "cliffs" can be obtained without etching of underlying material and that edge undercutting is simultaneously minimized.

It must be noted that the difference in the wetting properties of exposed and resist-coated films may cause the etching of uneven edges. As the substrate moves down into the etchant, a positive or upturning meniscus often forms on the exposed portions of the film while the areas where the electrolyte contacts a resist coating often exhibit a negative or downturning meniscus or depression effect. Therefore, the film material may be etched above the normal surface line where the film presents an uninterrupted unward path to the etchant. Similarly, etching in surges will occur where the etchant is retarded by surface tension on a resist-coated area. When the etchant "jumps" off the resist coating onto an unprotected area of film, it will usually leave islands of unetched material. These problems associated with uneven wetting ability may be substantially eliminated by using an "anti-creep" agent.

Where it was desired to remove a tantalum thin film 1400 A. thick from a glass substrate for the purpose of measuring film thickness, the etching solution was prepared by mixing film thickness, the etching solution was prepared by mixing lithium chloride with methanol in the ratio of 1 to 15. This was done by mixing 10 grams of lithium chloride in 300 milliliters of methanol. Alternatively, other electrically-conductive salt solutions, such as those containing ferric chloride or aluminum chloride, may be employed. The thus prepared electrolyte was floated as a layer ¼ to ⅜ inch deep on the top of a quantity of electrically nonconductive, inert silicone oil. It should be noted that, as the methanol evaporates, the lithium chloride solution becomes heavier. It has been found that the salt solution floats on the surface of the oil until it outweighs the oil at which time it will gather at one point on the surface of the oil and sink to the bottom of tank 10 without any intermixing. Drain 52 enables removal of the salt from the bottom of tank 10. In a typical situation, the salt solution will sink to the bottom of tank 10 during an overnight period when the equipment is not in use and upon restarting the process, the old solution will be drained off and fresh electrolyte will be floated on the oil.

After preparation of the bath, the tantalum-coated slide was cleaned by successively scrubbing with trichloroethane and acetone plus a final agitation in distilled water. The foregoing cleaning step, which removes surface contaminants and any loose tantalum, may not be necessary where the intent is merely the removal of a strip of material so as to enable a thickness measurement. Next, the cleaned slides were coated with an anti-creep agent comprising a solution of Desicote, a hydrophobic surface coating material in acetone. The cleaned and coated substrate was inserted in clamp 36 in such a manner that the clamp made electrical contact with the tantalum film.

Next, wiper arm 28 of potentiometer 25 was adjusted to apply 50 volts between cathode 12 and the film. For tantalum films that are less than 1500 A. in thickness, it has been found that good results are achieved when the voltage across the electrolyte is limited to 50 volts. For films between 1500 A. and 3000 A., the voltage will preferably be adjusted to 70 volts and, for films that are thicker than 3000 A., the voltage may be set at 80 volts. In the example being described, the maximum desirable current is 15 milliamperes.

Finally, the speed of immersion was set by adjusting the output voltage from source 54. While the speed control voltage varies with the apparatus, the usual speeds of immersion fall within the range of 0.167 to 0.333 inch per minute. With all the treatment parameters adjusted as discussed above, the slide was lowered into the bath and the tantalum film removed by etching which occurred only at a surface of the electrolyte. During the descent of the slide, the operator monitored ammeter 70 and, whenever the etching current exceeded 15 milliamperes, switch 66 was manually opened. Opening of switch 66 caused a halt in the descent of the slide until etching was completed at that level. When the current again dropped below the value indicative of incomplete etching (15 ma.), switch 66 was reclosed and the descent resumed. When the slide had been lowered to the desired depth, approximately one-third of the way into the bath, switch 32 was opened to terminate electrolytic action and the slide was withdrawn from the bath and placed in the film thickness measuring apparatus. Thickness measurements were then made by the method discussed in the above-mentioned Schwartz and Brown article. To verify the accuracy of the results of the thickness measurement, the slide was visually examined under a microscope and it was observed that a sharply defined step was presented to the stylus of the measuring apparatus along the line where etching was terminated and that there was no etching of the slide adjacent to this step.

*Anodization process*

Where it is desired to anodize either separated or adjacent regions to the same or different degrees, a bath is prepared in the same manner as when etching. That is, the electrolyte 20 is floated on the surface of the inert liquid 18 to a depth commensurate with the width of the regions to be treated. The materials or articles to be anodized are then prepared and inserted in clamp 36. In preparation of articles to be anodized, it should be noted that all regions thereon to be treated should be electrically connected to each other. Thus, where it is desired to anodize a plurality of strips of film-forming metal carried by a substrate to produce the oxide-dielectric layers for thin-film capacitors, it is advisable to form a frame of the metal about the periphery of the substrate. Clamp 36 will make contact to this frame and all of the strips to be treated are thus simultaneously connected to current source 24.

As previously noted, the thickness of the oxide layer formed during anodization of a film-forming metal is a function of the anodizing voltage. Considering tantalum, the oxide layer builds up at a rate of about 7 A. per volt. Thus, the voltage between the material being anodized and cathode 12 provides an indication of oxide thickness. Accordingly, to effect automatic control of the process, unit 44 will contain means, not shown, responsive to the voltage between the anode (material being treated) and cathode 12 for generating a control signal when the anodizing voltage reaches a preselected value. Such voltage sensitive circuits are well known in the art.

In operation, a low voltage will initially be measured between the cathode and anode. This voltage will gradually increase as the oxide layer builds up. When the voltage reaches a preselected value, in the fabrication of capacitors usually in the range of 100 to 150 volts, a control signal will be generated which will cause motor 42 to drive the substrate downward into inert liquid 18 a distance sufficient to place the next region to be anodized in electrolyte 20. The control signal will also, through appropriate means not shown, cause switch 31 to be opened and held open. A clock or timer, not shown, is started by the control signal. After a predetermined interval, the clock provides a signal which operates through appropriate circuitry to reclose a switch. Thus, switch 31 is held open until a sufficient time has elapsed to permit the inert liquid to push the electrolyte up the film to the normal surface level. This stabilization time thus minimizes the effect of the meniscus which is formed each time the article being treated is driven downwardly through the electrolyte.

Upon reclosing of switch 31, a second region will be anodized, possibly to a different voltage. While the process can be manually controlled by an operator, the anodizing voltage for each step of movement, the size of each step and the stabilization time may be prerecorded on a suitable medium and automatic control thus be enabled. Thus, unit 44 may be a general purpose computer.

In a typical example, it was desired to form a plurality of tantalum thin-film capacitors of different value on one side of a glass substrate in accordance with the method disclosed in above-mentioned Berry Patent 2,993,266. The substrate, a rectangular glass slide, was prepared by state-of-the-art techniques so as to have a tantalum area film 4000 A. to 5000 A. thick on one side thereof. Next, the areas which were to be employed as capacitor lower electrodes were defined by photoresist etching. This produced a slide having capacitor electrodes located in ¼ inch wide strips separated by ¼ inch wide areas from which all of the tantalum had been removed. All of the capacitor electrodes made contact with a strip or frame of tantalum about the edge of the slide. It was this strip of tantalum which made electrical contact with the source of anodizing potential via clip 36 when the slide was inserted in the apparatus.

For anodizing, a .01% citric acid solution was employed as the electrolyte. This solution was floated on top of the inert liquid as the layer. In the example being discussed, since the material to be anodized was located in ¼ inch wide strips separated by ¼ inch, the electrolyte layer was made between ¼ and ½ inch deep. As when etching, the inert liquid was silicon oil.

The prepared slide was inserted in clip 36 and lowered into the bath so as to place the first electrode to be anodized in the electrolyte layer. Switch 32 was then closed and, with switch 66 open, the operator observed volt meter 68 until a voltage commensurate with the desired oxide-dielectric layer thickness was measured. At this point, switch 66 was closed and the slide lowered into the bath until a second electrode was exposed to electrolyte 20. Switch 66 was then opened and the process repeated until the required voltage, different from that to which the first electrode was anodized, was measured by meter 68. This procedure efficiently produced a slide having a plurality of tantalum electrodes having oxide-dielectric layers of different thicknesses formed thereon.

While the process as described above relates to anodization to form the dielectric layers in capacitors which are separated by nonconductive areas, it is to be understood that this invention may also be employed to trim anodize individual resistors or groups of resistors to value on the same or separate substrates. Also, this invention may be used to produce a dielectric-oxide layer exhibiting a thickness gradient such as would find utility in frequency sensitive, electroluminescent capacitors.

It should further be noted that, in the fabrication of thin-film capacitors, it is often desired to interrupt the anodization process with a short period of "back etching." This "back etching," which removes impurities from the oxide-dielectric, can be accomplished with the instant invention merely by providing a switch to reverse the potential between the film being treated and the electrode 12.

Thus, while a preferred embodiment has been shown and described, various modifications of this invention are possible without deviating from the spirit and scope thereof. Accordingly, it is to be understood that this invention is described by way of illustration rather than limitation.

What is claimed is:

1. A method of treating electrolytically a workpiece comprising:
- floating a layer of an electrolyte on the surface of a nonconductive fluid to form a treatment bath,
- inserting the workpiece into the bath to expose a first selected portion thereof to the electrolyte layer,
- passing current through both the electrolyte layer and the workpiece to electrolytically treat the first selected portion, and then
- further inserting the workpiece into the bath to terminate the electrolytic treatment of the first selected portion.

2. The method of claim 1 wherein the step of further inserting the workpiece includes both immersing the first selected portion in the nonconductive fluid to terminate the electrolytic treatment thereof and exposing a second selected portion of the workpiece to the electrolyte layer.

3. The method of claim 1 wherein the step of further inserting the workpiece into the bath is effected by relative movement between the workpiece and the layer of electrolyte substantially normal to the surface of the electrolyte layer.

4. The method of claim 2 wherein the step of further inserting the workpiece into the bath includes:
effecting the further insertion in stepwise fashion to first expose the second workpiece portion to the electrolyte layer and to then expose serially subsequent workpiece portions to the electrolyte layer.

5. A method of treating electrolytically a workpiece comprising:
forming a treatment bath by floating a layer of an electrolyte on the surface of a nonconductive fluid,
moving relatively the workpiece and the bath for inserting the workpiece into the bath to expose a selected portion thereof to the electrolyte layer,
passing a current through both the electrolyte layer and the workpiece to electrolytically treat the selected workpiece portion,
monitoring a parameter of the electrolytic treatment, and
further moving the workpiece relatively to the electrolyte layer when the monitored treatment parameter indicates that the selected workpiece portion has been treated to the desired degree, the further movement immersing the selected workpiece portion in the nonconductive fluid.

6. The method of claim 5 wherein the step of monitoring includes:
measuring the voltage drop across the electrolyte and the workpiece.

7. The method of claim 5 wherein the step of monitoring includes:
measuring the current passing through the selected workpiece portion.

8. A method of electrolytically etching one or more selected portions of a film of material carried by a nonconductive substrate which comprises the steps of:
forming a bath by floating an electrolyte as a layer on the surface of an inert, nonconductive liquid;
immersing the substrate carrying the film of material to be etched in the bath to a depth which exposes a first selected film portion to the electrolyte;
passing current through the electrolyte and the film to etch the first selected film portion; and
lowering the substrate further into the bath so that successive selective portions of the film are exposed to the electrolyte, the etching of the first and of the successive selected film portions being terminated by submersion thereof in the inert, nonconductive liquid.

9. A method of treating electrolytically a workpiece comprising the steps of:
floating an electrolyte layer on a nonconductive liquid, exposing a selected portion of said workpiece to said electrolyte layer,
passing a current through both said layer and said workpiece to treat electrolytically said selected workpiece portion, and then
immersing said selected workpiece portion in said nonconductive liquid to terminate said treatment.

10. The method set forth in claim 9 wherein said immersion of said selected workpiece portion in said liquid exposes a subsequent selected workpiece portion to said electrolyte layer.

11. The method set forth in claim 10 wherein said electrolytic treatment comprises etching said selected workpiece portion.

12. The method set forth in claim 10 wherein said electrolytic treatment comprises anodizing said selected workpiece portion.

13. The method set forth in claim 11 wherein said immersing is effected in response to the measurement of a parameter of said etching.

14. The method set forth in claim 12 wherein said immersing is effected in response to the measurement of a parameter of said anodizing.

15. The method set forth in claim 13 wherein in response to said parameter measurement said immersing is effected to etch said selected workpiece portion along a line defined by the surface of said electrolyte layer.

16. The method set forth in claim 13 wherein in response to said parameter measurement said immersing is effected to anodize said selected workpiece portion along a line defined by the surface of said electrolyte layer.

References Cited

UNITED STATES PATENTS

| | | | |
|---|---|---|---|
| 1,396,919 | 11/1921 | Brace | 204—228 |
| 2,532,907 | 12/1950 | Hangosky | 204—143 |
| 2,545,411 | 3/1951 | Perret-Bit | 204—228 |
| 2,545,412 | 3/1951 | Perret-Bit | 204—228 |
| 2,827,725 | 3/1958 | Edds | 204—143 |
| 2,943,030 | 6/1960 | Tcheyeyan | 204—15 |

FOREIGN PATENTS 24,806 1906 Great Britain.

JOHN H. MACK, *Primary Examiner.*

T. TUFARIELLO, *Assistant Examiner.*

UNITED STATES PATENT OFFICE

CERTIFICATE OF CORRECTION

Patent No. 3,388,047 June 11, 1968

Ralph M. Higgins

It is certified that error appears in the above identified patent and that said Letters Patent are hereby corrected as shown below:

Column 2, line 18, "U.S. Patent 2,993,226" should read -- U.S. Patent 2,993,266 --. Column 8, line 14, "silicon" should read -- silicone --. Column 10, line 29, claim reference numeral "13" should read -- 14 --.

Signed and sealed this 21st day of October 1969.

;EAL)
ttest:

lward M. Fletcher, Jr.
ttesting Officer

WILLIAM E. SCHUYLER, JR.
Commissioner of Patents